(12) United States Patent
Hull et al.

(10) Patent No.: US 7,575,122 B2
(45) Date of Patent: Aug. 18, 2009

(54) OUTLET BOX KNOCKOUT

(75) Inventors: Eric G. Hull, Madison, OH (US);
Gregory D. Turcovsky, Mentor, OH (US); Dennis P. Revlock, Sr., Medina, OH (US)

(73) Assignee: The Lamson & Sessions Co., Cleveland, OH (US)

( * ) Notice: Subject to any disclaimer, the term of this patent is extended or adjusted under 35 U.S.C. 154(b) by 877 days.

(21) Appl. No.: 11/014,136

(22) Filed: Dec. 16, 2004

(65) Prior Publication Data

US 2005/0092506 A1 May 5, 2005

Related U.S. Application Data

(63) Continuation-in-part of application No. 10/680,798, filed on Oct. 7, 2003, now Pat. No. 7,353,961.

(51) Int. Cl.
*H02G 3/08* (2006.01)
*H02G 3/18* (2006.01)
*B65D 6/40* (2006.01)

(52) U.S. Cl. .............. 220/3.2; 174/666; 220/254.2; 220/266; 220/277; 220/284; 220/661

(58) Field of Classification Search .......... 220/3.2, 220/254.1, 266, 277, 284, 661; 174/666
See application file for complete search history.

(56) References Cited

U.S. PATENT DOCUMENTS

| | | | |
|---|---|---|---|
| 2,000,851 A * | 5/1935 | Knell | 220/3.2 |
| 2,154,310 A | 4/1939 | Kinnard | |
| 2,240,187 A | 4/1941 | Kingdon et al. | |
| 2,378,529 A * | 6/1945 | Austin, Jr. | 285/154.3 |
| 3,349,946 A * | 10/1967 | Lee | 220/3.2 |
| 3,659,246 A * | 4/1972 | Martin | 439/102 |
| 4,189,964 A | 2/1980 | Gray | |
| 4,316,999 A * | 2/1982 | Nattel | 174/661 |
| 4,640,433 A | 2/1987 | Jorgensen et al. | |
| 4,675,782 A | 6/1987 | Hibbert et al. | |
| 4,688,146 A | 8/1987 | Newmark et al. | |
| 4,716,496 A | 12/1987 | Fritsch | |
| 4,750,411 A | 6/1988 | Eversole | |
| 4,805,920 A | 2/1989 | Gavin | |
| 5,043,536 A | 8/1991 | DeBartolo, Jr. | |
| 5,148,348 A | 9/1992 | White | |
| 5,191,171 A | 3/1993 | Bordwell | |
| 5,286,040 A | 2/1994 | Gavin | |
| 5,444,183 A | 8/1995 | Gehrs et al. | |
| 5,704,578 A | 1/1998 | Fischer | |
| 5,728,973 A | 3/1998 | Jorgensen | |
| 5,769,659 A | 6/1998 | Ceylan | |
| 5,804,764 A | 9/1998 | Gretz | |
| 5,906,508 A | 5/1999 | Jeffcoat | |
| 5,950,277 A | 9/1999 | Tallmadge et al. | |
| 5,959,250 A | 9/1999 | Daoud | |
| 6,031,182 A | 2/2000 | Daoud | |
| 6,103,973 A | 8/2000 | Sharp | |

(Continued)

*Primary Examiner*—Anthony D Stashick
*Assistant Examiner*—Niki M Eloshway
(74) *Attorney, Agent, or Firm*—Jones Day

(57) ABSTRACT

A knockout in a sidewall of a plastic electrical box has a slot for receiving a screwdriver tip to apply a knockout force to the knockout. The slot is located adjacent the box bottom wall to minimize deformation of the sidewall by a knockout force.

11 Claims, 4 Drawing Sheets

U.S. PATENT DOCUMENTS

| | | |
|---|---|---|
| 6,125,881 A | 10/2000 | Hobbs et al. |
| 6,239,368 B1 | 5/2001 | Gretz |
| 6,242,697 B1 | 6/2001 | Gerken et al. |
| 6,264,056 B1 | 7/2001 | King |
| 6,278,058 B1 * | 8/2001 | Anderson .................... 174/50 |
| 6,441,307 B1 | 8/2002 | Shotey et al. |
| 6,672,389 B1 * | 1/2004 | Hinrichs .................... 166/317 |
| 6,765,147 B1 | 7/2004 | Weiss et al. |
| 6,812,405 B1 | 11/2004 | Hull et al. |
| 6,870,101 B1 | 3/2005 | Hull et al. |
| 6,914,187 B2 | 7/2005 | Hull et al. |
| 6,940,017 B2 | 9/2005 | Roesch et al. |
| 2002/0060891 A1 | 5/2002 | Buie, Jr. |
| 2002/0066581 A1 | 6/2002 | Bashford |

* cited by examiner

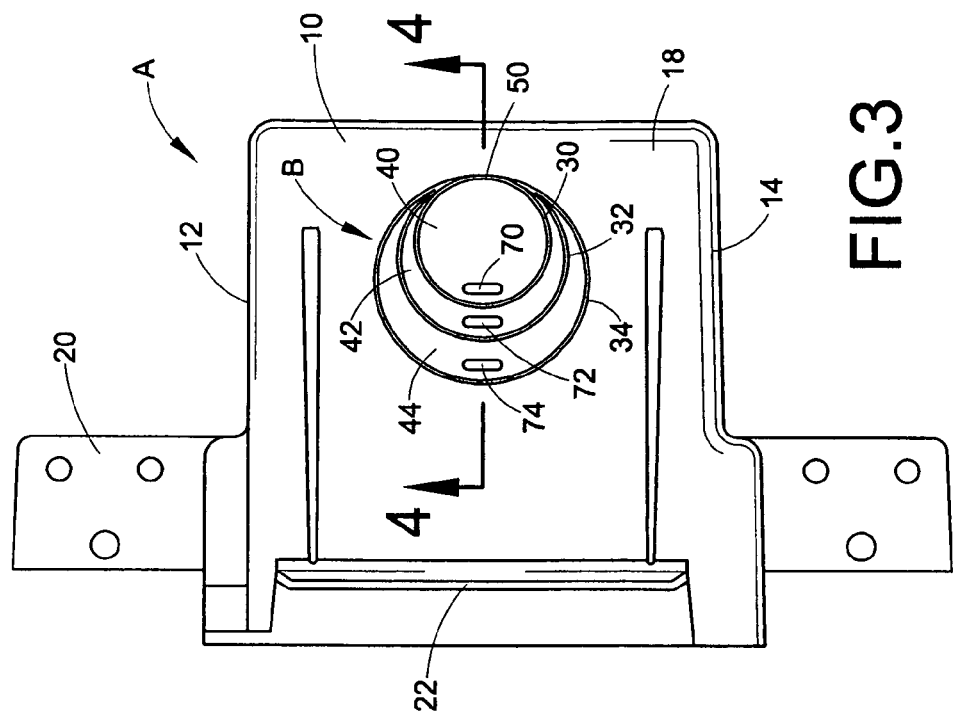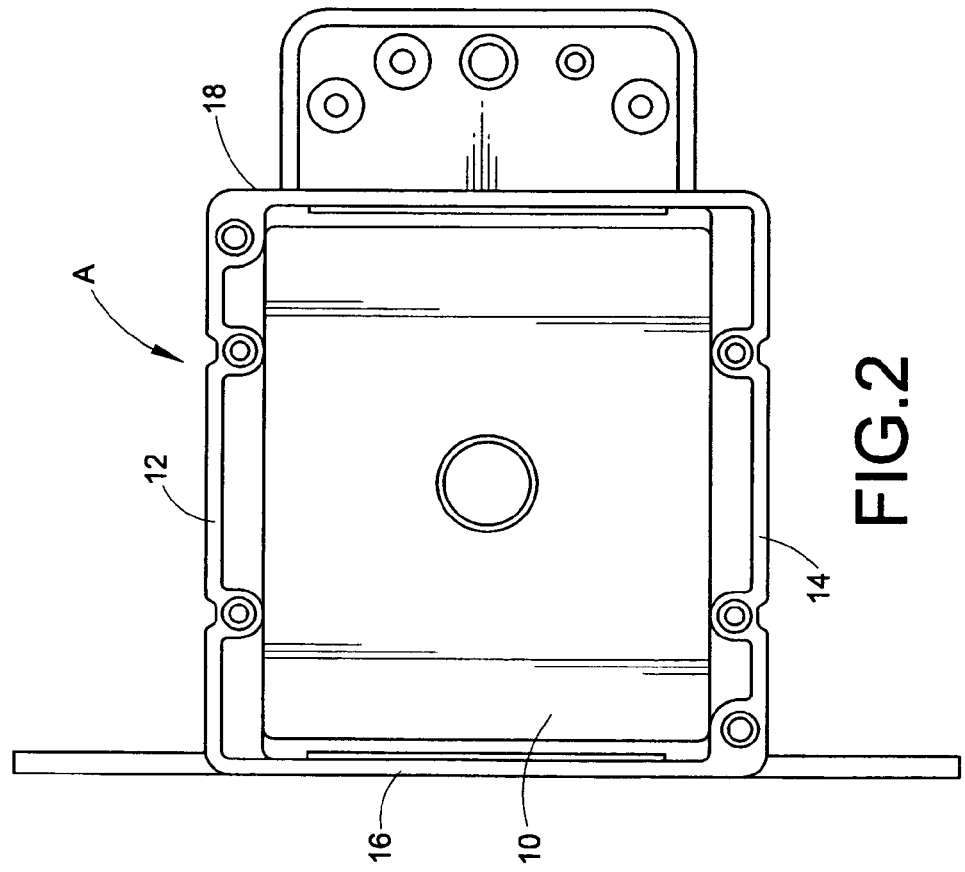

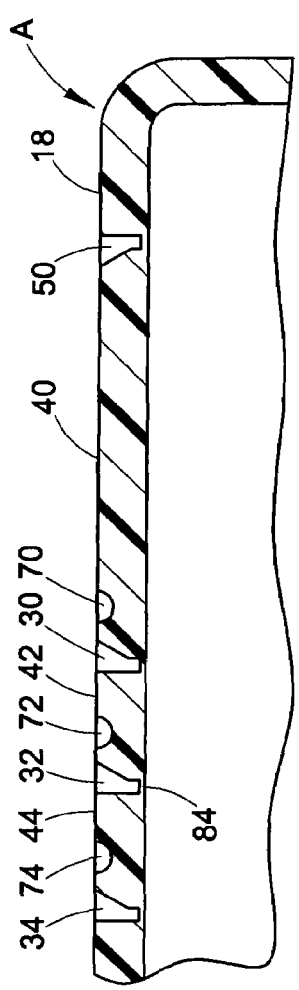
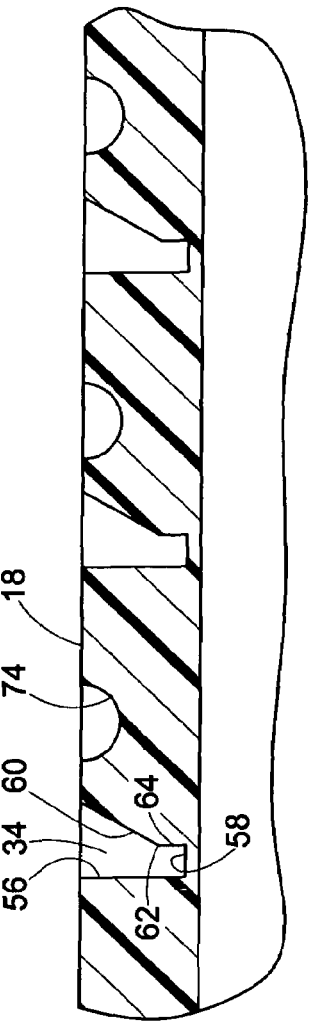
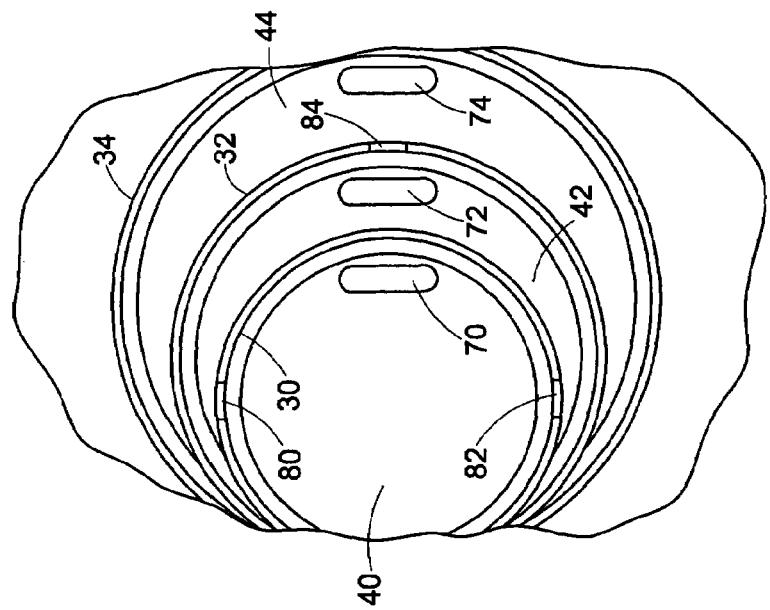

OUTLET BOX KNOCKOUT

REFERENCE TO RELATED APPLICATION

This application is a continuation-in-part of U.S. patent application Ser. No. 10/680,798 filed Oct. 7, 2003 now U.S. Pat. No. 7,353,961, which is hereby incorporated herein by reference and the benefit of the filing date of which is hereby claimed.

BACKGROUND OF THE INVENTION

This application relates to electrical outlet boxes that are molded of plastic material and have knockouts molded into the box walls. However, it will be appreciated that the invention has broader aspects, and that the knockout arrangement of the present application can be used in other types of housings and enclosures.

It is common to mold knockouts in the walls of electrical boxes to provide openings for attaching conduits and fittings to the box. It is difficult to mold the knockouts in a manner that provides easy removal of a desired knockout without dislodging other knockouts. It also is difficult to provide an arrangement for molding the knockouts into the box walls while ensuring plastic flow to the knockout areas during the molding process.

SUMMARY OF THE INVENTION

A plastic electrical box having an entrance opening, a bottom wall opposite from said entrance opening and a peripheral wall extending between said entrance opening and said bottom wall. A generally circular knockout in the peripheral wall has a slot in its outer surface adjacent its outer periphery for receiving a screwdriver tip to apply force to the knockout for removing same. The knockout is oriented with the slot for the screwdriver tip located adjacent the box bottom wall to minimize deformation of the peripheral wall by a force applied to the knockout at the location of the slot.

A knockout arrangement in a plastic wall includes inner, intermediate and outer circular grooves that are eccentric relative to one another and overlap at a tangent location. All three of the grooves have a common minimum depth at the tangent location and a common maximum depth opposite from the tangent location.

The grooves circumscribe inner, intermediate and outer knockouts that have slots opposite from the tangent location for receiving the tip of a flat blade screwdriver to facilitate removal of the knockouts. The knockouts are oriented with the tangent location positioned closest to the box entrance opening so that the screwdriver slots are closest to the box bottom wall.

Weakened areas are provided in the box wall at the bottom of the inner and intermediate grooves so that removal of the inner knockout will not result in removal of the intermediate or outer knockouts, and so that removal of both the inner and intermediate knockouts will not result in removal of the outer knockout.

The minimum groove depth at the tangent location provides a path for flow of plastic across the grooves to fill the mold cavity in the area of all of the knockouts.

It is a principal object of the invention to provide an improved knockout arrangement.

It is another object of the invention to provide a knockout arrangement that provides easy knockout removal while minimizing the possibility that other knockouts will be undesirably displaced.

BRIEF DESCRIPTION OF THE DRAWING

FIG. 2 is a plan view of the box looking at its open end;

FIG. 3 is an end elevational view thereof;

FIG. 4 is a partial cross-sectional elevational view taken generally on line 4-4 of FIG. 3;

FIG. 5 is an enlarged partial cross-sectional elevational view showing the shape of the grooves that are molded into the box walls;

FIG. 6 is a partial plan view of a knockout arrangement showing the weakened areas in the grooves for the small and intermediate knockouts.

DESCRIPTION OF A PREFERRED EMBODIMENT

Figure 1:
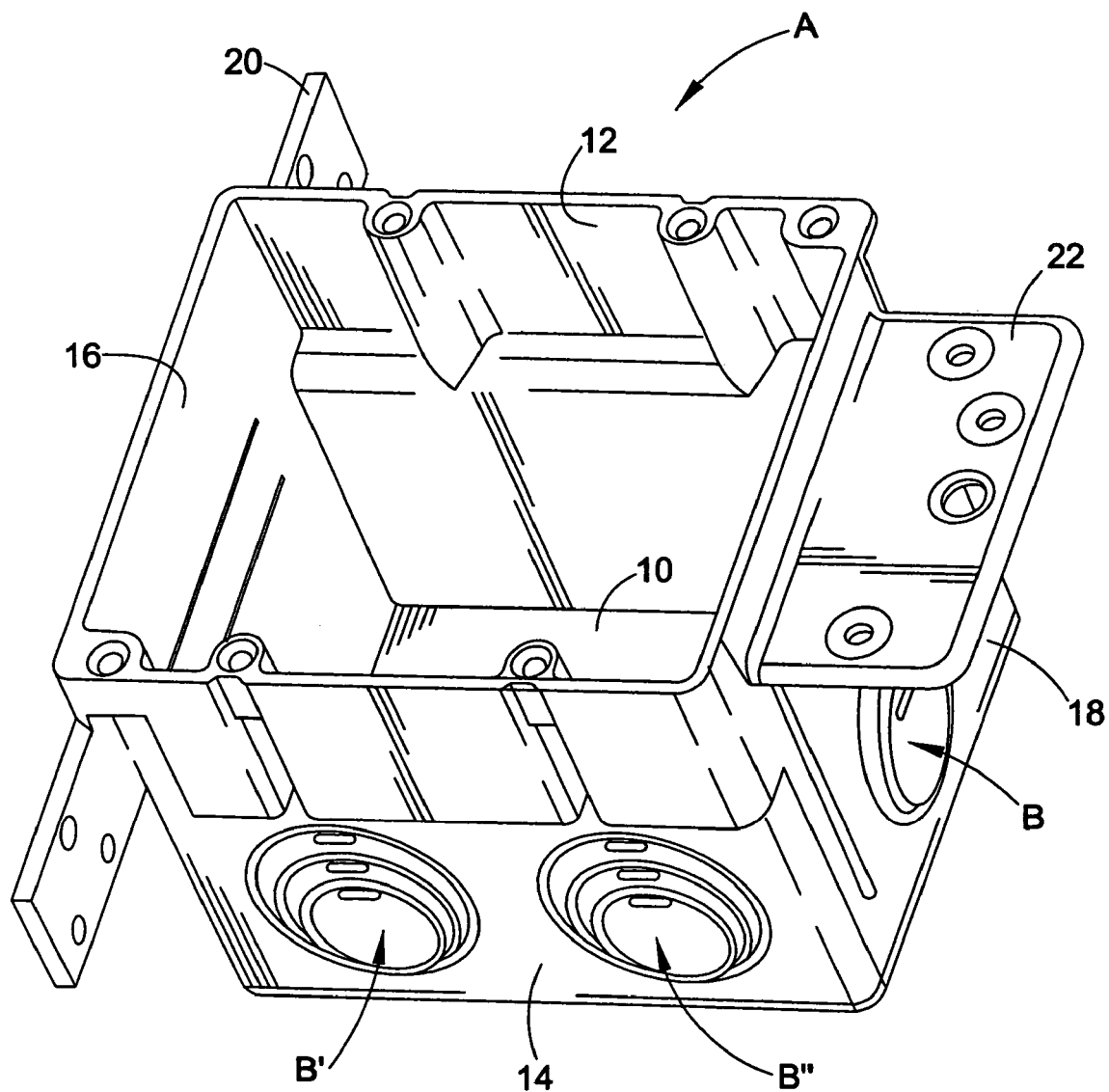
FIG. 1 is a perspective illustration of a molded plastic box having the knockout arrangement of the present application incorporated therein.

Referring now to the drawing, wherein the showings are for purposes of illustrating representative embodiments of the invention only and not for purposes of limiting same, FIG. 1 shows an electrical outlet box molded of plastic material such as, but not necessarily limited to, PVC or polycarbonate. Box A has a bottom wall 10, opposite side walls 12, 14 and opposite end walls 16, 18. Box A has an open front end opposite from bottom wall 10. Although a two gang box is illustrated in the drawings, it will be appreciated that the invention can be used with single gang boxes as well as with boxes, enclosures and housings of many other types. Box A has mounting flanges 20, 22 for attaching same to wall studs or to joists.

FIG. 3 shows a knockout arrangement B that is molded into wall 18. It will be recognized that the knockout arrangement of the present application may be provided in one or more of the box walls and that some box walls may have more than one knockout arrangement. For example, two knockout arrangements, B' and B" are shown in box wall 14 in FIG. 1.

Knockout arrangement B is formed by molding inner, intermediate and outer circular grooves 30, 32 and 34 into the exterior surface of box wall 18. The circular grooves define inner, intermediate and outer circular knockouts 40, 42 and 44. The knockouts and grooves are eccentrically positioned relative to one another and overlap at a tangent location 50. Intermediate groove 32 surrounds inner groove 30 except along tangent location 50, and outer groove 34 surrounds intermediate groove 32 except along the tangent location 50. The three grooves overlap one another over around 45° of inner groove 30, and over smaller arcs of intermediate and outer grooves 32, 34 so that the tangent location is actually an arcuate overlap. The knockouts are oriented such that tangent location 50 is adjacent box bottom wall 10.

The openings formed by removal of the knockouts usually are seven-eighths inch for inner knockout 40, one and one-eighth inch for intermediate knockout 42, and one and three-eighths inch for outer knockout 44. Removal of a knockout provides a circular hole in the box wall for attaching conduits or fittings thereto. The circular holes receive one-half inch, three-fourths inch and one inch trade size conduit or fittings.

All of grooves 30, 32 and 34 have a common minimum depth where they overlap one another at tangent location 50. All three of the grooves have a common maximum depth at a maximum depth location that is opposite from tangent location 50. By way of example, box wall 18 may have a nominal thickness of about 0.092 inch. The depth of the grooves at tangent location 50 then is about 0.075 inch and the maximum depth of all of the grooves generally opposite from tangent location 50 is the same at about 0.082 inch. Thus, the remaining wall thickness between the groove bottoms and the inner surface of wall 18 at tangent location 50 is about 0.017 inch and the remaining wall thickness at the maximum groove depth location is about 0.010 inch. The depth of the grooves gradually increases along an inclined arcuate path from minimum depth tangent location 50 to the opposite maximum depth locations, and all of the grooves have approximately the same depth.

With reference to FIG. 5, groove 34 has an outer circumferential groove wall 56 that extends generally perpendicular to the flat outer surface of wall 18. Outer groove wall 56 intersects a flat groove bottom wall 58 that extends generally parallel to the flat inner and outer surfaces of wall 18 and has a radial dimension of about 0.025 inch. Groove circumferential inner wall 60 is inclined at an included angle with the vertical of about 30° and does not extend all the way down to groove bottom wall 58. Instead, inclined groove inner side wall 60 has an intersection 62 with a short circumferential inner groove wall 64 extending upwardly from groove bottom wall 58 generally parallel to outer wall 56.

Intersection point 62 preferably is more than half-way from the outer surface of wall 18 toward the inner surface thereof and still more preferably is located about three-fourths of the way from the outer surface of wall 18 toward the inner surface thereof. It will be recognized that flat bottom wall 58 and short perpendicular wall 64 can be eliminated so that groove inclined inner wall 60 would intersect groove outer wall 56. The groove bottoms then would be a relatively sharp intersection between groove walls 56 and 60.

An elongated arcuate slot or recess 70, 72 and 74 is provided in the outer surface of each knockout 40, 42 and 44 adjacent the outer periphery thereof generally opposite from tangent location 50. Each slot or recess 70, 72 and 74 is a shallow depression in the outer surface of each knockout that lies on a chord of each circular knockout. The chord extends generally parallel to box bottom wall 10. Each depression is elongated in a direction between box sidewalls 16, 18, and has a curved bottom as shown in FIG. 4.

Slots or recesses 70, 72 and 74 receive the tip of a flat bladed screwdriver for selectively applying a force on each knockout in a direction toward the inside of the box. The slots or depressions 70, 72 and 74 preferably are shallow and extend less than half-way into the thickness of wall 18.

Areas of increased weakness are provided in wall 18 at the bottom of inner groove 30 and intermediate groove 32. FIG. 6 shows areas of weakness 80, 82 at the bottom of inner groove 30 and area of weakness 84 at the bottom of intermediate groove 32. The areas of weakness may be slots or holes that extend completely through the box wall. However, it will be appreciated that the holes may be at least partly closed by plastic flash during the molding process or may not extend entirely through the wall. Therefore, the areas of weakness may be recesses that extend into the groove bottoms further toward the wall inner surface. The areas of weakness are recesses or holes that are about one-eighth inch long around the circumference of a groove and are formed only through flat groove bottom wall 58, or otherwise have a very narrow radial dimension radially of a knockout so as to be not much more than a slit through the box wall at the bottom of a groove.

The weakened areas either are through holes or slits, or the remaining thickness of plastic that remains is so thin that it is equivalent to a through hole or slit because it provides little or no resistance against removal of a knockout. Thus, the box wall in an area of weakness is completely severed or is substantially severed to the point where the remaining box wall material is so thin that it provides little or no strength.

The areas of increased weakness occupy a very small fraction of the circumference of a groove. By way of example, areas of increased weakness 80, 82 occupy less than 10% of the total circumference of inner groove 30. In general, the areas of increased weakness within the inner groove would occupy not more than about 25% of the groove circumference and more preferably not more than about 15% of the groove circumference.

The area of increased weakness within intermediate groove 32 occupies not more than about 5% of the total circumference of intermediate groove 32. In general, the area or areas of increased weakness within the intermediate groove would occupy not more than about 15% of the circumference of the intermediate groove, and more preferably not more than about 10% of the groove circumference. The areas of weakness within the inner groove are a much larger percent of the inner groove circumference than the percent of the intermediate groove circumference occupied by the intermediate groove areas of weakness.

Area of weakness 84 within the intermediate groove is located generally opposite from tangent location 50. Areas of weakness 80, 82 within inner groove 30 are located generally opposite one another approximately midway between tangent location 50 and the opposite maximum depth location. Obviously other locations may be provided, and different numbers or sizes of areas of weakness may be provided.

None of grooves 30, 32 or 34 extend all the way through wall 18 except in the areas of increased weakness 80, 82 and 84 which occupy a very small fraction of a groove circumference and a small fraction of a groove width radially of a knockout so that each area of weakness is like a circumferential line or slit of weakness. Tangent location 50 where all of the grooves overlap one another has a larger remaining wall thickness to enhance flow of plastic to all of the knockout areas during the molding process.

Recesses 70, 72 and 74 are located closely adjacent grooves 30, 32 and 34 at the maximum groove depth locations that are generally opposite or 180° from tangent location 50. Force applied to a knockout with a tool having a tool tip received in a recess 70, 72 or 74 then acts on the weakest area of the wall that remains between the groove bottom and the wall interior surface. This insures that the inner or intermediate knockouts will be severed without displacing the outer knockout, and also facilitates knockout removal.

Figure 7:
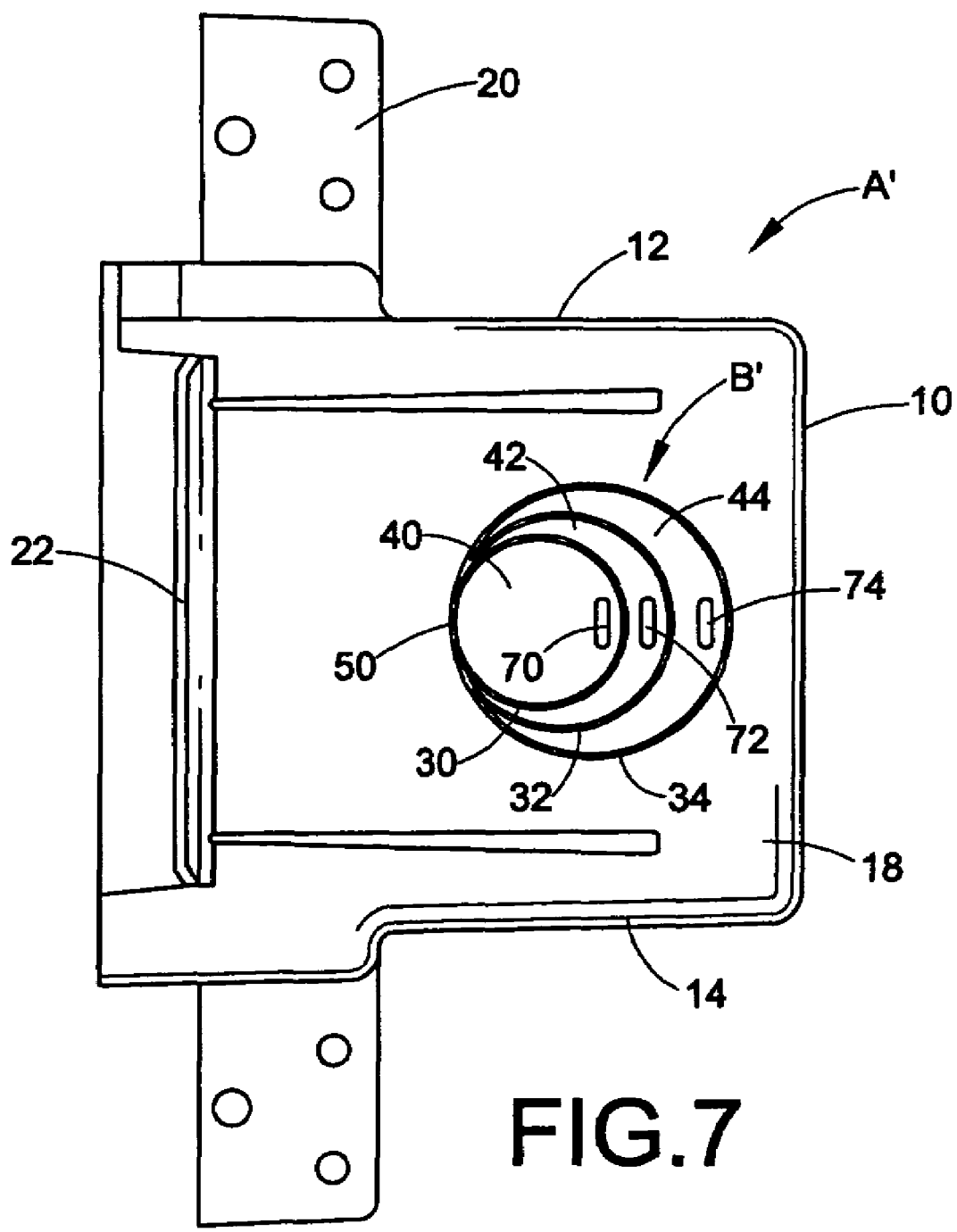
FIG. 7 is a view similar to FIG. 3 showing a preferred orientation of a knockout relative to a box bottom wall.

FIG. 7 shows box A' having knockout arrangement B' oriented with tangent location 50 positioned closest to the box entrance opening and with screwdriver tip slots 70, 72 and 74 positioned adjacent to box bottom wall 10. Box bottom wall 10 reinforces and stiffens sidewall 18 to minimize deformation thereof when a force is applied to the knockouts for removing same. In the arrangement of FIG. 3, the screwdriver slots 70, 72 and 74 are located closest or adjacent to the open end of the box, and sidewall 18 is subject to significant deformation when force is applied to remove a knockout.

Bottom wall 10 effectively forms a stiffening structure that is molded integrally with sidewall 18 and extends thereacross adjacent to the knockout arrangement and the slots 70, 72 and 74 to minimize deformation of sidewall 18 when a knockout force is applied to any one of the knockouts 40, 42 or 44 for separating same from wall 18.

In a box where the height of sidewall 18 measured from the outside surface of bottom wall 10 to the plane of the box open end is around 3.25 inches, all of slots 70, 72 and 74 are located within 1.625 inches from the outside surface of box bottom wall 10, and more preferably within 1.0 to 1.25 inches from the outside surface of bottom wall 10. Thus, all of slots 70, 72 and 74 are located within one-half of the height of sidewall 18 from the outer surface of bottom wall 10, and more preferably within about one-third of the height of sidewall 18 from the outer surface of bottom wall 10. The slots 70, 72 and 74 are aligned with one another generally parallel to the box depth and perpendicular to the bottom wall 10, but other arrangements are possible as long as the slots are close enough to another wall or stiffening structure to minimize deformation of wall 18 when a knockout force is applied to any of the knockouts at the location of a slot 70, 72 or 74.

Although the invention has been shown and described with reference to a preferred embodiment, it is obvious that alterations and modifications will occur to others skilled in the art upon the reading and understanding of this application. Therefore, it is to be understood that the invention may be practiced otherwise than as specifically described herein while remaining within the scope of the claims.

We claim:

1. An electrical outlet box of plastic material, said box having a plurality of walls, at least one knockout arrangement in at least one of said walls, said knockout arrangement comprising inner, intermediate and outer generally circular grooves in said wall circumscribing inner, intermediate and outer knockouts, each knockout having a slot therein adjacent its circumscribing groove for receiving a tip of a flat bladed screwdriver to apply a force to a knockout and separate same from the one wall, said knockout arrangement being positioned and oriented with said slots adjacent to another of said box walls so that the other box wall stiffens the one box wall to minimize deformation thereof when a knockout force is applied to one of said knockouts at the location of one of said slots.

2. The box of claim 1 wherein said grooves are eccentric with respect to one another and overlap one another at a tangent location, said grooves varying in depth from a minimum depth at said tangent location to a maximum depth generally opposite from said tangent location, and said slots being located generally opposite from said tangent location.

3. The box of claim 1 wherein said grooves are eccentric with respect to one another and overlap one another at a tangent location, and said slots being located generally opposite from said tangent location.

4. The box of claim 1 wherein said other box wall is a box bottom wall.

5. An electrical box having an open end, a bottom wall opposite from said open end and a peripheral wall extending between said open end and said bottom wall, at least one knockout circumscribed by a groove in said peripheral wall, said knockout having an outer surface with a slot therein adjacent said groove for receiving a screwdriver tip to apply a knockout force to the knockout for separating same from the peripheral wall, said slot being located adjacent to said bottom wall to minimize deformation of said peripheral wall when a force is applied to the knockout at the slot location;
  wherein said knockout is one of a plurality of eccentrically positioned inner and outer knockouts circumscribed by inner and outer grooves in said peripheral wall, said inner and outer grooves overlying one another at a tangent location, each of said inner and outer knockouts having a slot therein for receiving a screwdriver tip, said slots in each of said inner and outer knockouts being located generally opposite from said tangent location and adjacent to said bottom wall.

6. The box of claim 5 wherein said inner and outer grooves have a common first depth at said tangent location and a second depth generally opposite from said tangent location that is greater than said first depth.

7. The box of claim 6 wherein said second depth is the same for all of said grooves.

8. An electrical box having an open end, a bottom wall opposite from said open end and a peripheral wall extending between said open end and said bottom wall, at least one knockout circumscribed by a groove in said peripheral wall, said knockout having an outer surface with a slot therein adjacent said groove for receiving a screwdriver tip to apply a knockout force to the knockout for separating same from the peripheral wall, said slot being located adjacent to said bottom wall to minimize deformation of said peripheral wall when a force is applied to the knockout at the slot location;
  wherein said knockout is one of a plurality of eccentrically positioned inner intermediate and outer knockouts circumscribed by inner intermediate and outer grooves in said peripheral wall, said inner intermediate and outer grooves overlying one another at a tangent location, each of said inner intermediate and outer knockouts having a slot therein for receiving a screwdriver tip, said slots in each of said inner intermediate and outer knockouts being located generally opposite from said tangent location and adjacent to said bottom wall.

9. The box of claim 8 wherein said inner, intermediate and outer grooves have a common first depth at said tangent location and a second depth generally opposite from said tangent location that is greater than said first depth.

10. The box of claim 9 wherein said second depth is the same for all of said grooves.

11. A molded plastic wall having at least one knockout therein circumscribed by a groove in said wall, a slot in said knockout adjacent said groove for receiving a tip of a flat bladed screwdriver to apply a force to said knockout and separate same from said wall, a stiffening structure molded integrally with said wall and extending thereacross adjacent to said groove and said slot for stiffening said wall to minimize deformation thereof when a knockout force is applied to said knockout at the location of said slot;
  wherein said knockout is one of a plurality of eccentrically positioned inner intermediate and outer knockouts circumscribed by inner intermediate and outer grooves in said peripheral wall, said inner intermediate and outer grooves overlying one another at a tangent location, each of said inner intermediate and outer knockouts having a slot therein for receiving a screwdriver tip, said slots in each of said inner intermediate and outer knockouts being located generally opposite from said tangent location and adjacent to said stiffening structure.

* * * * *